United States Patent [19]
Argabright et al.

[11] 3,779,940
[45] Dec. 18, 1973

[54] POLYISOCYANURIC ACID EMULSIFYING AGENTS AND DERIVATIVES

[75] Inventors: Perry A. Argabright, Larkspur; C. Travis Presley, Littleton, both of Colo.

[73] Assignee: Marathon Oil Company, Findlay, Ohio

[22] Filed: Feb. 9, 1972

[21] Appl. No.: 224,904

[52] U.S. Cl................. 252/312, 252/356, 252/357, 260/77.5 NC, 260/248 NS, 260/29.2 TN
[51] Int. Cl............................................. C08g 22/00
[58] Field of Search.................... 252/312, 356, 357; 260/77.5 NC, 248 NS, 29.2 TN

[56] References Cited
UNITED STATES PATENTS
3,573,259  3/1971  Argabright et al................. 260/77.5

OTHER PUBLICATIONS

Noller, Chemistry of Organic Compounds, W. B. Saunders Co., Philadelphia, 1951, p. 186.

*Primary Examiner*—Donald E. Czaja
*Assistant Examiner*—M. J. Welsh
*Attorney*—Joseph C. Herring et al.

[57] ABSTRACT

A mixture of molecules containing all of the following groups exhibit surface activity: isocyanurate, hydrogen-substituted isocyanurate, metal substituted isocyanurate, and at least one group selected from the class consisting of a monovalent organic radical selected from the following: isocyanate urethane ($-NHCO_2R'$), urea ($-NHCONHR'$), amino ($-NH_2$, $-NHR'$, or $-NR_2'$).

7 Claims, 4 Drawing Figures

ARYLARALKYL:

ALKENE:

$-CH_2-CH=CH-CH_2-$ , $-CH_2-CH=C-CH_3$ , $-CH=CH-CH=CH-$ ,
                                 |

POLYMERIC:

(WHERE n MAY BE FROM 1 to 50)

BICYCLIC:

POLYISOCYANURIC ACID EMULSIFYING AGENTS AND DERIVATIVES

CROSS REFERENCES TO RELATED APPLICATIONS

The following United States Patent applications relate to the general field of the present invention:
Ser. No. 715,199, filed Mar. 22, 1968;
Ser. No. 89,883, filed Nov. 16, 1970;
Ser. No. 72,388, filed Sept. 15, 1970;
Ser. No. 72,288, filed Sept. 15, 1970;
Ser. No. 157,236, filed June 28, 1971;

BACKGROUND OF THE INVENTION

1. Field of the Invention

The present invention relates to compositions-surface active generally classified in the United States Patent Office in Class 252, subclasses -351 and -353 through -358.

2. Description of the Prior Art

A search in the United States Patent Office disclosed the following prior art: U.S. Pat. No. 3,072,654 teaches calcium di (dichloroisocyanurate) in bleaching and cleaning compositions; U.S. Pat. No. 3,272,813 complexes chloroisocyanurates with potassium to make bleaching compositions (see column 16, lines 63–70; and U.S. Pat. No. 3,489,696 forms polyimides from isocyanurates and polycarboxylic acids and mentions use of biuret triisocyanate at column 5, line 62.

SUMMARY OF THE INVENTION

General Statement of the Invention

The present invention relates to a new class of compounds which are useful as emulsifying agents, e.g., in forming dispersions and emulsions. These compounds are characterized by containing in a single molecule all of the following groups:

isocyanurate:

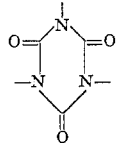

hydrogen-substituted isocyanurate:

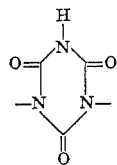

and at least one group selected from the class consisting of: a monovalent organic radical selected from the following: isocyanate, urethane (-NHCO$_2$R'), urea (-NHCONHR'), amino (-NH$_2$, -NHR' or NHR$_2$'), and may or may not contain in addition to the above, metal substituted isocyanurate:

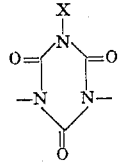

The compounds of the present invention have the general structure shown in FIG. 1; where:

R = divalent hydrocarbon or substituted hydrocarbon radical, as described below and exemplified in FIG. 2

X = a metal, or hydrogen or quaternary ammonium (which for the purposes of this invention, acts like a metal) or a combination thereof. Particularly preferred are hydrogen, quaternary ammonium and metals selected from the following groups of the Periodic Table; Ia, Ib,IIa, IIb, IIIa, IIIb, IVa, IVb, Va, Vb, VIa; including such metals as Li, Na, K, Rb, Cs, Ca, Ag, Au, Be, Mg, Ca, Sr, Ba, Ra, Zn, Cd, Hg, B, Al, Sc, Y, La, and the other rare earths, Ac, Ga, In, Tl, Ti, Zr, Hf, Ge, Sn, Pb, V, Nb, Ta, Sb, Bi, Cr, Mo, W, Mn, Fe, Ru, Co, Ni, Rh, Pd, Os, and Ir.

A = a monovalent organic radical selected from the following:
isocyanate urethane (-NHCO$_2$R'), urea (-NHCONHR'), amino (-NH$_2$, -NHR' or -NR$_2$')

R' = monovalent hydrocarbon or substituted hydrocarbon radical, as discussed below;

M = average number of trisubstituted isocyanurate rings and is a positive integer from 0 to about 400, and most preferably from 0 to about 200, Q = average number of isocyanuric acid groups and is a positive integer from 1 to about 10,000, more preferably from 2 to about 1000, and most preferably from 3 to about 100, N-Q = average number of isocyanurate salt groups and is a positive integer from 0 to about 10,000 more preferably from 1 to about 1,000 and most preferably from 2 to about 100, 2M+N+1 = average number of divalent R groups and is a positive integer from 2 to about 11,000, more preferably from 3 to about 1,100 and most preferably from 4 to about 140, M+2 average number of A groups and is a positive integer from 2 to about 2,000, more preferably from 2 to about 400 and most preferably from 2 to about 200;

and wherein there are no N-to-N bonds, no A-to-N bonds, no A-to-A bonds, and no R-to-R bonds.

R preferably contains two to 40, more preferably two to 30, and most preferably two to 18 carbon atoms.

R' preferably contains one to 40 carbon atoms, more preferably one to 20 carbon atoms and most preferably one to 10 carbons, for example —CH$_3$, — C$_2$H$_5$, —C$_3$H$_7$, i—C$_3$H$_7$

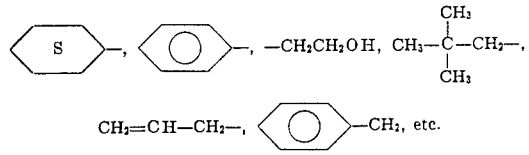

R and/or R' can be substituted with groups that do not interfere in the products' subsequent utility or in its preparation. Examples of such non-interfering groups are: —NO$_2$, Cl, F, Br, I, CN, —CO$_2$R", —CO—R", —O—R", —SR", NR$_2$" —CONR$_2$", —SO$_3$R, —SO$_2$—, —SO—, phenyl naphthyl, alkyl (one-40 carbon atoms), PO₃R'', cyclohexyl, cyclopropyl, polymethylene (e.g., tetramethylene), -OCOR'',

etc. where R'' may be hydrogen, lower alkyl (e.g., ethyl, hexyl) or aryl (e.g., monovalent radicals corresponding to the aryl radicals described in FIG. 2. The examples of R (shown in FIG. 2) are set forth for purposes of elucidation, not restriction.

It will be recognized that the values of M, N, and Q described above are on the basis of the integers which will be used to describe a single molecule. In actual practice, the invention will involve mixtures of molecules of the general form described above. Thus, the average value of M for the mixture may be from about 1 to about 350, more preferably from about 1 to 200, and most preferably from about 1 to 100; the average value of Q may be from about 1.5 to 9,000, more preferably from about 2.0 to 1,000, and most preferably from about 3.0 to 100; the value of N-Q may be from about 0 to 9,000, more preferably from 0.1 to 800, and most preferably from 0.5 to 200.

UTILITY OF THE INVENTION

The present invention relates to a new class of emulsifying agents, their preparation, and processes for their use. For example, the compounds of the present invention may be added to immiscible mixtures of water and organic compounds, e.g., equal parts by volume of water and a hydrocarbon and the resulting mixture agitated to form emulsions. This result is all the more surprising as many of the compounds are only very slightly soluble in either phase.

DESCRIPTION OF THE PREFERRED EMBODIMENTS

Starting Materials: The starting materials for the present invention are metal salts of polyisocyanuric acids produced according to the techniques taught in copending United States Pat. No. 3,573,259 issued Mar. 30, 1971, by reacting a metal cyanate and an organic diisocyanate in the presence of an aprotic solvent to form isocyanurate-containing polyisocyanate metal salts.

Figure 1:
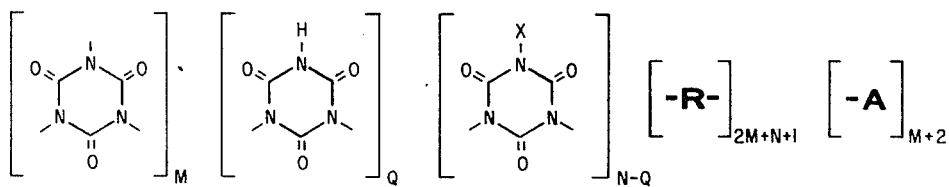
FIG. 1 shows the general formula of the products of the present invention.
Figure 2:
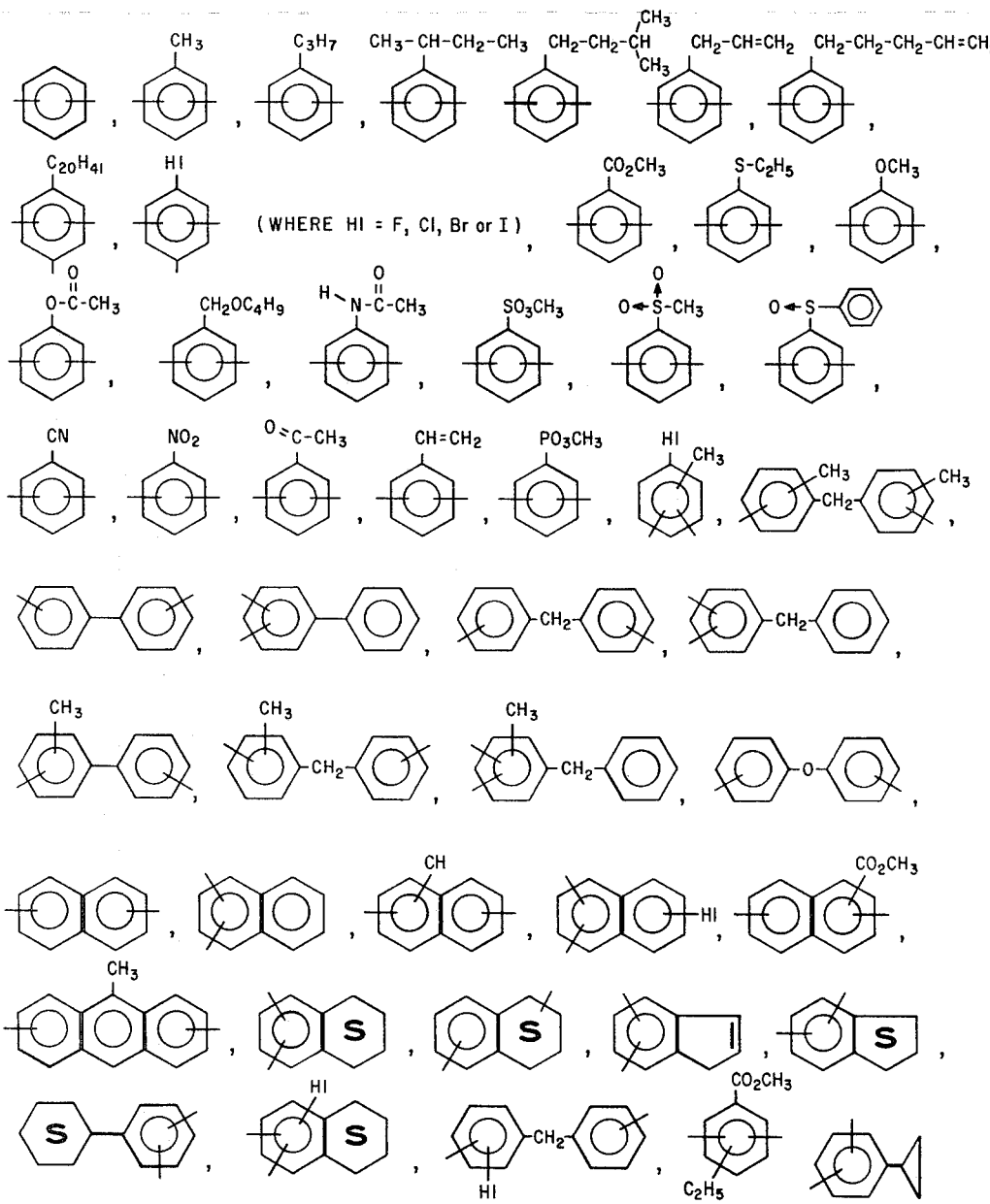
FIGS. 2 and 3 exemplify some of the possible structures of R groups of the starting materials and products of the present invention.
Figure 3:
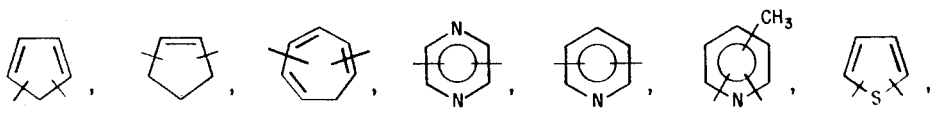
Figure 3:
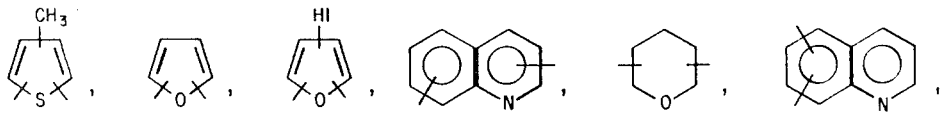
Figure 3:
Figure 3:
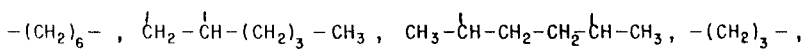
Figure 3:
Figure 3:
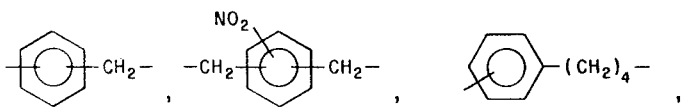
Figure 3:
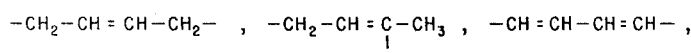
Figure 3:
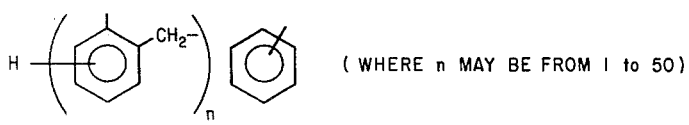
Figure 4:
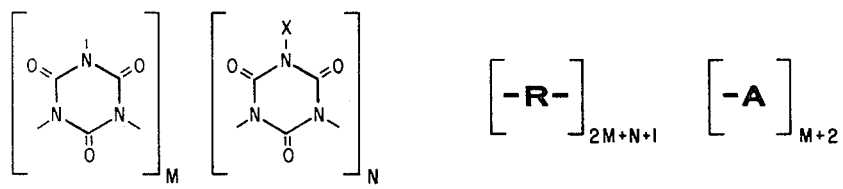
FIG. 4 shows the general formula of the organic starting materials of the present invention.

It has been discovered that aqueous solutions of the aforementioned isocyanurate salts, of the general formula shown in FIG. 4, (where the lettered groups are as described above under "Summary of the Invention"), under acid conditions (i.e., pH below 6,) give the product shown in FIG. 1. The product is dramatically less soluble in water than is the polyisocyanurate salt reactant. Suitable acids include mineral acids e.g., HCl, H₂SO₄, HNO₃, and carboxylic acids, e.g., acetic acid. Reaction Media: Water or mixtures of water and an alcohol, ketone, ester, amide, sulfoxide, sulfone, etc.

Temperature: While not narrowly critical, temperatures in the range from 10° to about 200°C. are preferred, with 15°–150°C. being more preferred and 20–120°C. being most preferred. The lower limit is generally the freezing point of solution and the upper limit is generally the boiling point of the solution at the reaction pressure.

Pressure: While not narrowly critical, the reaction can be carried out at pressures of from 0.5 to 100, with 0.6 to 50 being more preferred, and 0.7 to 10 atmospheres being most preferred.

Time: The reaction time, of course, is dependent on the initial concentration of the starting materials and the temperature. The preferred time is from 0.01 to 4500 hours, more preferred 0.05 to 350 hours, and most preferred from 0.06 to 200 hours.

Examples:

EXAMPLE I

Preparation of Polyisocyanurate Salt

To a stirred slurry of 82.4 KOCN (1.02 mole) in 2000 ml of dimethylformamide (DMF) at 75°C. 183g of tolylene diisocyanate (1.05 mole) is added at a rate of 0.85 ml/min. by means of a syringe pump.

The entire operation is carried out in a nitrogen atmosphere. Following the addition, the reaction mixture is stirred an additional 10 minutes, the temperature lowered to 60°C., dry methanol added (large excess), and allowed to react for an additional hour to insure complete quenching. The major product is insoluble in DMF and thus readily separated by a single filtration. A trace DMF soluble product is obtained after solvent stripping the filtrate. After vacuum drying at 80°C. to remove residual DMF and methanol, the following yield and analytical data are obtained:

| Product | % Yield[1] | Aryl/end Group[2] Ratio (2M+N+1/M+2) Wt. | Average Mol. (Min.) |
|---|---|---|---|
| DMF insoluble[3] | 87.0 | 14.5 | 8,000 |
| DMF soluble | 12.0 | 1.5 | 750 |

(1) corrected for residual DMF
(2) measured by nuclear magnetic resonance spectroscopy
(3) contains 20.9% DMF of solvation.

EXAMPLE II

Preparation of Polyisocyanuric Acid

The polyisocyanurate product (DMF insoluble) of Example I is dissolved in water to give a 7% (by weight) solution. The pH of this solution is adjusted to 5.5 by adding aqueous HCl. The conversion is substantially immediate. The product is a water-insoluble solid. Aliquots of this suspension are used for testing without further purification.

EXAMPLES III – V

The utility of the polyisocyanuric acid as an emulsifying agent is demonstrated in the following manner.

To a graduate, containing 10 ml of n-heptane (or benzene as described in Table 1), and 10 ml of water (deionized and distilled) is added 2 ml of 7 weight percent aqueous solution of the polyisocyanurate salt described in Example I. Additional hydrochloric acid is added to provide the pH stated in Table 1. Subsequent shaking provides a stable emulsion having the volume indicated in Table 1.

TABLE I

| Example No. | pH | Emulsion Phase (ml) | Water Phase (ml) | Hydrocarbon |
|---|---|---|---|---|
| III | 3.5 | 20 | 3.6 | n-Heptane |
| IV | 1.0 | 19 | 3.8 | n-Heptane |
| V | 1.0 | 21 | 2.4 | Benzene |

MODIFICATIONS OF THE INVENTION

It should be understood that the invention is capable of a variety of modifications and variations which will be made apparent to those skilled in the art by a reading of the specification and which are to be included within the spirit of the claims appended hereto.

What is claimed is:

1. A composition comprising a mixture of compounds comprising in a single molecule isocyanurate, metal isocyanurate, and having the structure:

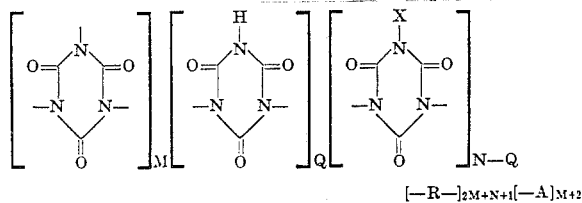

$$[-R-]_{2M+N+1}[-A]_{M+2}$$

wherein
- R = divalent hydrocarbon or substituted hydrocarbon radical, containing two to about 40 carbon atoms,
- X is selected from the group consisting of metals, hydrogen, or quaternary ammonium radicals,
- A is a monovalent organic radical selected from the group consisting of $-NHCO_2R'$, $-NHCONHR'$, $-NH_2$, $-NHR'$, and $-NR'_2$,
- R' is a monovalent hydrocarbon radical or substituted hydrocarbon radical containing from one to about 40 carbon atoms,
- M is the average number of trisubstituted isocyanurate rings per molecule and is a positive integer from 0 to about 400,
- Q is the average number of isocyanuric acid groups and is a positive integer from 1 to about 10,000,
- 2M+N+1 = the average number of divalent R groups and is a positive integer from 2 to about 11,000,
- M+2 is the average number of A groups and is a positive integer from 2 to about 2,000, and wherein there are no N-to-N bonds, no A-to-N bonds, no A-to-A bonds, and no R-to-R bonds,
- N-Q is the average number of isocyanurate salt groups and is a positive integer from 0 to about 10,000.

2. A composition according to claim 1 wherein R is selected from the group of organic radicals shown below:

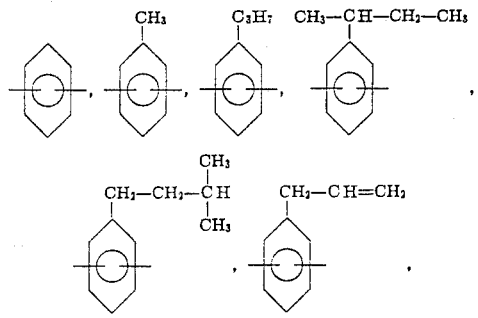

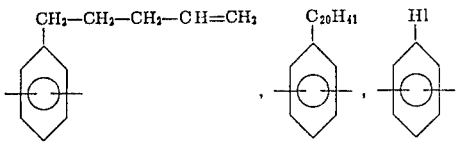

(where H1=F, Cl, Br or I),

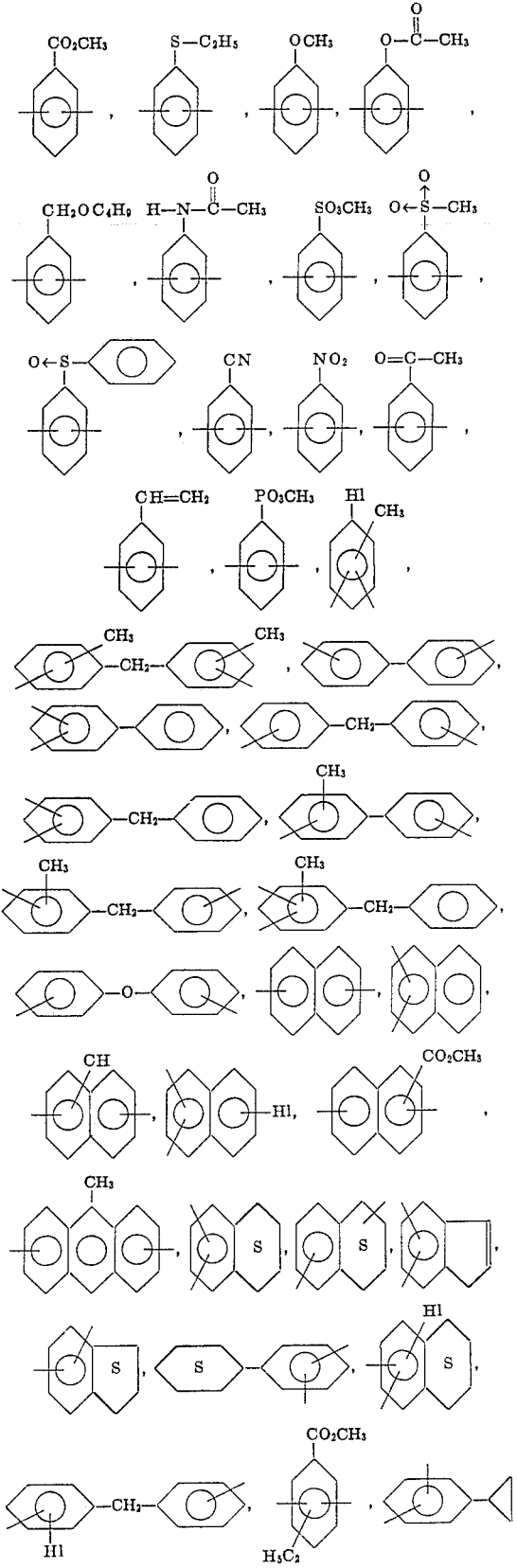

3. Compositions according to claim 1 wherein X is selected from the group consisting of hydrogen, quaternary ammonium radicals and metal radicals selected from the following groups of the Periodic Table; Ia, Ib, IIa, IIb, IIIa, IIIb, IVa, IVb, Va, Vb, VIa 4. Compositions according to claim 1 wherein M is a positive integer from 0 to about 200, wherein Q is a positive integer from 3 to about 100, and N-Q is from 2 to about 100, and wherein 2M+N+1 is a positive integer from 4 to about 140, and wherein M+2 is a positive integer from about 2 to about 200.

5. Compositions according to claim 1 wherein R is selected from the group of organic radicals shown in the structure below:

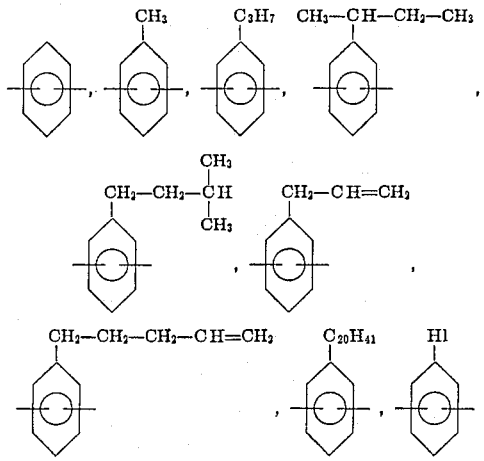

(where Hl=F, Cl, Br or I),

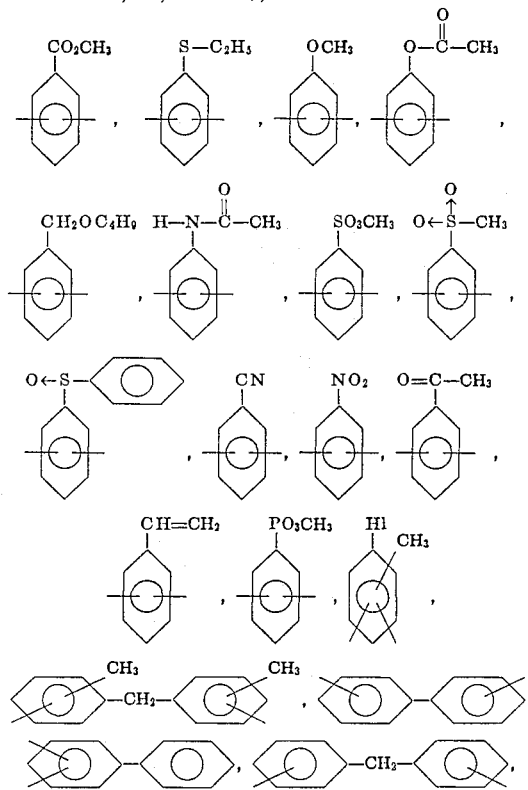

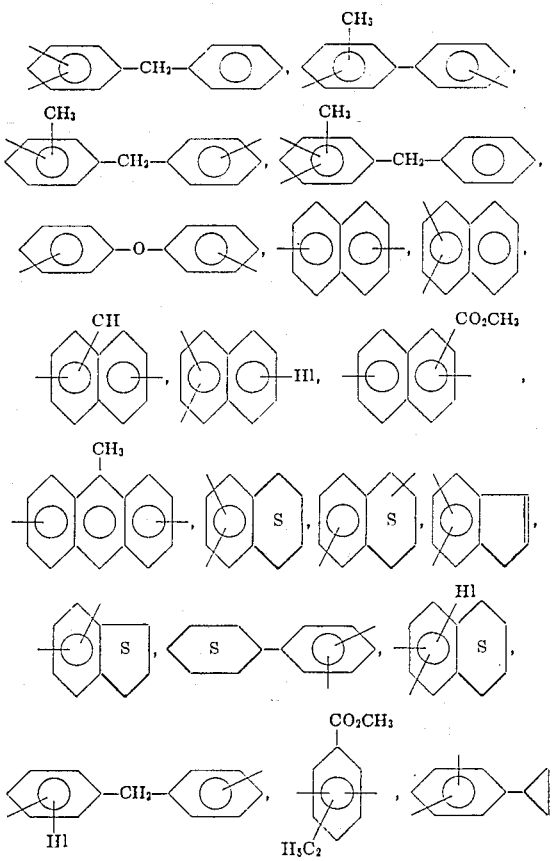

and the substitute derivatives thereof which are substituted with radicals selected from the group consisting of —NO, Cl, F, Br, I, CN, —CO$_2$R', —CO—R'', —O—R'', —SR'', NR$_2$'', —CONR$_2$'', —SO$_3$R, —SO$_2$—, —SO—, phenyl, naphthyl, PO$_3$R'', cyclohexyl, cyclopropyl, polymethylene, —OCOR'', and $$-\underset{\underset{H}{|}}{N}COR''$$

where R'' may be hydrogen or lower alkyl or aryl.

6. A composition according to claim 1 wherein R' contains from one to 10 carbon atoms and is selected from the group consisting of —CH$_3$, —C$_2$H$_5$, —C$_3$H$_7$, i—C$_3$H$_7$, —CH$_2$CH$_2$OH, CH$_3$—C(CH$_3$)(CH$_3$)—CH$_2$—, CH$_2$=CH—CH$_2$—, and 7. An emulsion comprising both water and at least one composition according to claim 1.

* * * * *